United States Patent
Keller et al.

(10) Patent No.: US 12,434,704 B2
(45) Date of Patent: Oct. 7, 2025

(54) METHOD FOR SUPPORTING AN AUTOMATICALLY DRIVING VEHICLE

(71) Applicant: Mercedes-Benz Group AG, Stuttgart (DE)

(72) Inventors: Christoph Gustav Keller, Stuttgart (DE); Holger Mielenz, Ostfildern (DE)

(73) Assignee: Mercedes-Benz Group AG, Stuttgart (DE)

( * ) Notice: Subject to any disclaimer, the term of this patent is extended or adjusted under 35 U.S.C. 154(b) by 248 days.

(21) Appl. No.: 17/907,277

(22) PCT Filed: Feb. 8, 2021

(86) PCT No.: PCT/EP2021/052911
§ 371 (c)(1),
(2) Date: Sep. 26, 2022

(87) PCT Pub. No.: WO2021/190812
PCT Pub. Date: Sep. 30, 2021

(65) Prior Publication Data
US 2023/0111226 A1   Apr. 13, 2023

(30) Foreign Application Priority Data

Mar. 27, 2020  (DE) .................... 10 2020 108 480.3
Jul. 15, 2020   (DE) .................... 10 2020 118 664.9

(51) Int. Cl.
*B60W 30/00*      (2006.01)
*B60W 30/095*    (2012.01)
(Continued)

(52) U.S. Cl.
CPC .. *B60W 30/18163* (2013.01); *B60W 30/0956* (2013.01); *B60W 60/0015* (2020.02);
(Continued)

(58) Field of Classification Search
CPC ....... B60W 30/18163; B60W 60/0015; B60W 30/0956; B60W 2554/4041; B60W 2556/45; B60W 2554/80
See application file for complete search history.

(56) References Cited

U.S. PATENT DOCUMENTS

2018/0349802 A1* 12/2018 Jiang .................... G08G 1/0145
2019/0206255 A1*  7/2019 Tao ......................... G08G 1/164
2019/0329780 A1* 10/2019 Tomescu .............. B62D 15/029

FOREIGN PATENT DOCUMENTS

CN         105151043 A      12/2015
CN         106991846 A       7/2017
(Continued)

OTHER PUBLICATIONS

China National Intellectual Property Administration, Office Action in Application No. CN202180022578.5, dated Oct. 24, 2023, 21 pages.
(Continued)

*Primary Examiner* — Vivek D Koppikar
*Assistant Examiner* — Jeffrey R Chalhoub
(74) *Attorney, Agent, or Firm* — Marshall & Melhorn, LLC

(57) ABSTRACT

A method for supporting an automatically driving vehicle is provided. In one embodiment, it is ascertained whether it is possible for the automatically driving vehicle to change lanes to a fast lane in order to pass an obstacle located in front of the automatically driving vehicle on a roadway. If not, the automatically driving vehicle stops before reaching the obstacle and transmits a support request to a vehicle-external center. The vehicle-external center detects another vehicle in the surroundings of the automatically driving vehicle and instructs same to move in the direction of the
(Continued)

automatically driving vehicle and change to the fast lane before reaching the automatically driving vehicle.

7 Claims, 2 Drawing Sheets

(51) Int. Cl.
    *B60W 30/18* (2012.01)
    *B60W 60/00* (2020.01)
(52) U.S. Cl.
    CPC . *B60W 2554/4041* (2020.02); *B60W 2554/80* (2020.02); *B60W 2556/45* (2020.02)

(56) References Cited

FOREIGN PATENT DOCUMENTS

| | | | |
|---|---|---|---|
| CN | 109739246 A | 5/2019 | |
| CN | 109987093 A | 7/2019 | |
| CN | 110136484 A | 8/2019 | |
| CN | 110365733 A | 10/2019 | |
| DE | 102010013402 A1 | 11/2010 | |
| DE | 102014215980 A1 | 2/2016 | |
| DE | 102015001971 A1 | 8/2016 | |
| DE | 102017210252 A1 | 12/2017 | |
| DE | 102016212148 A1 | 1/2018 | |
| DE | 102018101114 A1 | 7/2018 | |
| DE | 102018003609 A1 | 10/2018 | |
| DE | 102018216082 A1 | 12/2018 | |
| DE | 102018205263 A1 | 10/2019 | |
| DE | 102018112513 A1 | 11/2019 | |
| DE | 102018116982 A1 | 12/2019 | |
| EP | 3091520 A1 | 11/2016 | |
| WO | WO-2016169515 A1 * | 10/2016 | ............. B60L 50/50 |

OTHER PUBLICATIONS

German Patent Office, Office Action in Application No. DE 10 2020 108 480.3, dated Nov. 10, 2020, 6 pages, Munich Germany.
European Patent Office, International Search Report and Written Opinion in Application No. PCT/EP2021/052911, dated May 6, 2021, 16 pages. Rijswijk, Netherlands.

* cited by examiner

METHOD FOR SUPPORTING AN AUTOMATICALLY DRIVING VEHICLE

FIELD

The invention concerns a method for supporting an automatically driving vehicle according to the overview in the claims.

BACKGROUND

DE 10 2018 112 513 A1 discloses a method for supporting an autonomous vehicle with a remote operator. The autonomous vehicle is equipped with a communication unit that generates a communication connection with a control unit outside of the vehicle controlled by a remote operator. A system periphery is measured by a vehicle sensor array on the autonomous vehicle, and the situation of the vehicle's surroundings and an intended trajectory of the autonomous vehicle are transmitted through the communication connection to the control unit outside of the vehicle. Next the remote operator's approval of the intended trajectory or designation of a navigable area is transmitted to the autonomous vehicle, and the autonomous vehicle then continues on the intended trajectory or a new trajectory is calculated based on the remote operator's information and driven by the autonomous vehicle.

In addition, DE 10 2018 116 982 A1 discloses a method for at least partially automated control of a vehicle comprising the following steps:
  receives surroundings signals that represent the surroundings of the vehicle detected by a surroundings sensor array on the vehicle,
  upon detection of an object located in front of the vehicle and moving in the driving direction of the vehicle, based on the received surroundings signals,
  determines whether there is a street intersection within a passing trajectory for passing the object and whether oncoming traffic toward the vehicle is blocked for the duration of the passing action,
  if the determination result is that there is no street intersection within a passing trajectory for passing the object and that oncoming traffic is not blocked for the duration of the passing action, then control signals are sent out to the at least partially automated controls for lateral and longitudinal guidance of the vehicle based on the passing trajectory.

SUMMARY

The invention is intended to provide a method that improves upon the prior art for supporting an automatically driving vehicle.

The invention achieves this goal by means of a method having the features presented in the claims.

Advantageous embodiments of the invention are the object of the subordinate claims.

In a method according to the invention for supporting an automated vehicle, in particular a highly automated or autonomously driving vehicle, a determination is made as to whether, in order to pass an obstacle located in the roadway in front of the automatically driving vehicle, in particular due to traffic density, an automatic lane change of the automatically driving vehicle to a fast lane is possible. If it is not, the automatically driving vehicle stops before reaching the obstacle and a support query is sent by the automatically driving vehicle to a center outside of the vehicle.

The center outside of the vehicle detects another vehicle in the surroundings of the automatically driving vehicle, and the center outside of the vehicle instructs that other vehicle to move in the direction of the automatically driving vehicle and change to the fast lane before reaching it.

The method allows the automatically driving vehicle to safely pass the obstacle and to avoid or at least quickly resolve blockage situations, in particular on multi-lane roadways. Continued driving is therefore possible even in difficult situations.

This translates to increased traffic flow and fewer hazardous situations.

In one possible embodiment of the method, the automatically driving vehicle stops behind the obstacle in such a way that there is enough distance from the obstacle for the necessary acceleration before a lane change to the fast lane is required. The lane change can therefore be made safely.

In another possible embodiment of the method, together with the support query, the automatically driving vehicle sends the center its current position and the current range extent of its surroundings detection sensor system. Based on knowledge of the current position, a suitable support vehicle in the vicinity of the automatically driving vehicle can be detected more quickly, and based on knowledge of the range extent of the sensor system, the safety of passing the obstacle is increased, because the supporting vehicle can adapt its driving maneuvers and driving style to the range extent of the automatically driving vehicle's sensor system.

In another possible embodiment of the method, real-time position information is exchanged between the automatically driving vehicle and the other vehicle after it is selected by the center. This ensures that both the supporting vehicle and the automatically driving vehicle continually know the position of the other vehicle. In addition, the automatically driving vehicle's knowledge of the position means that it can reliably recognize the supporting vehicle when it approaches and can make a safe lane change.

In another possible embodiment of the method, each vehicle recognizes the other using data from onboard sensor arrays on the vehicles and appropriate classification processes.

This allows for particularly reliable and easily executed recognition of the respective vehicle.

In another possible embodiment of the method, signals from light emitters on the vehicles can also be used in order for them to recognize each other. This also allows for particularly easily achieved recognition.

In another possible embodiment of the method, the other vehicle reduces its speed no later than when it changes to the fast lane, and thereby causes traffic following it in the fast lane to slow down, which generates a large enough gap in the traffic for the automatically driving vehicle to make its lane change and pass the obstacle.

In another possible embodiment of the method, the other vehicle is detected in surroundings data detected by a surroundings detection sensor system on the automatically driving vehicle, and the automatically driving vehicle compares a position of the other vehicle detected in that manner with received position information pertaining to the other vehicle. This further increases accuracy and reliability in detecting the position of the supporting vehicle.

In another possible embodiment of the method, the speed of the other vehicle is detected by the automatically driving vehicle, and based on that speed and the position of the other vehicle, a trajectory is determined for safely passing the obstacle. This makes it possible to safely swing into the fast lane and safely pass the obstacle.

In another possible embodiment of the method, in order to achieve the greatest possible safety in making the lane change and passing the obstacle, the automatically driving vehicle makes the lane change automatically, if the determined risk of a collision with the other vehicle or another vehicle when performing the lane change is below a preset limit value.

DESCRIPTION OF THE FIGURES

Examples of the invention are explained in more detail below, with reference to figures.

The figures show.

DETAILED DESCRIPTION

The same items are marked with the same references in all figures.

Figure 1:
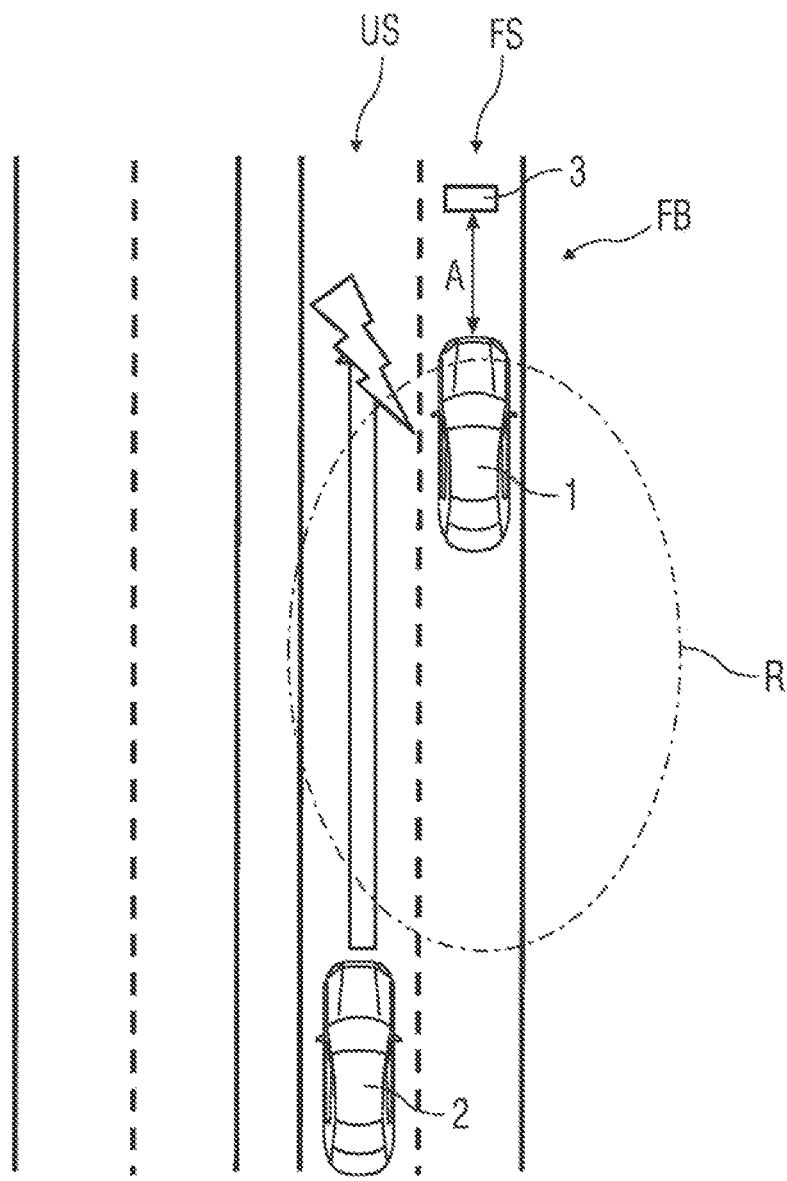
FIG. 1 schematic overhead view of a traffic situation.

FIG. 1 is an overhead view of a traffic situation with a vehicle 1, another vehicle 2, and an obstacle 3 on a multi-lane roadway.

The vehicle 1 is configured for automated driving, in particular highly automated or autonomous driving. The vehicle 1 can be a passenger car or utility vehicle.

As the automatically driving vehicle 1 moves in a driving lane FS on the multi-lane roadway FB toward the obstacle 3, depending on the traffic situation it may occur that the vehicle has to stop before reaching the obstacle 3. In such a case, situations may exist in which a lane change to avoid the obstacle 3 is not possible. This can happen in particular if a current range extent R of a surroundings detection sensor system is insufficient for a lane changing maneuver to be made safely. The automatically driving vehicle 1 is then blocked and cannot move forward.

In order to permit continued driving of the automatically driving vehicle 1 and safe passing of the obstacle 3 in such situations, first it is determined whether, in order to pass the obstacle 3 located in front of the automatically driving vehicle 1 in the roadway FB, due to traffic density, for example, an automatic lane change of the automatically driving vehicle 1 to a fast lane US is possible.

If it is not, because, for example, the sensor system cannot with certainty detect traffic components, such as the vehicle 2, approaching at high speed due to being outside of the detection area of its range extent R, the automatically driving vehicle 1 stops before reaching the obstacle 3 in the driving lane FS and sends a support query to a center outside of the vehicle. This results in the automatically driving vehicle 1 stopping behind the obstacle 3, in particular such that there is an adequate distance A to the obstacle 3, needed for the required acceleration before a lane change to the fast lane US.

The center outside of the vehicle is, for example, a back-end server, but can also be controlled or operated by a person.

Together with the support query, the automatically driving vehicle 1 transmits its current position and the current range extent R of its surroundings detection sensor system to the center. The position includes, in particular, a lateral position, a longitudinal position, and the driving lane FS in which the vehicle 1 is located.

After the transmission of the support query, the center outside of the vehicle determines another vehicle 4 that is suitable for supporting the automatically driving vehicle 1 and is in the area of the automatically driving vehicle 1 and instructs it to move in the direction of the automatically driving vehicle 1. The other vehicle 4 is also, for example, an automated vehicle, in particular a highly automated or autonomously driving vehicle.

Figure 2:
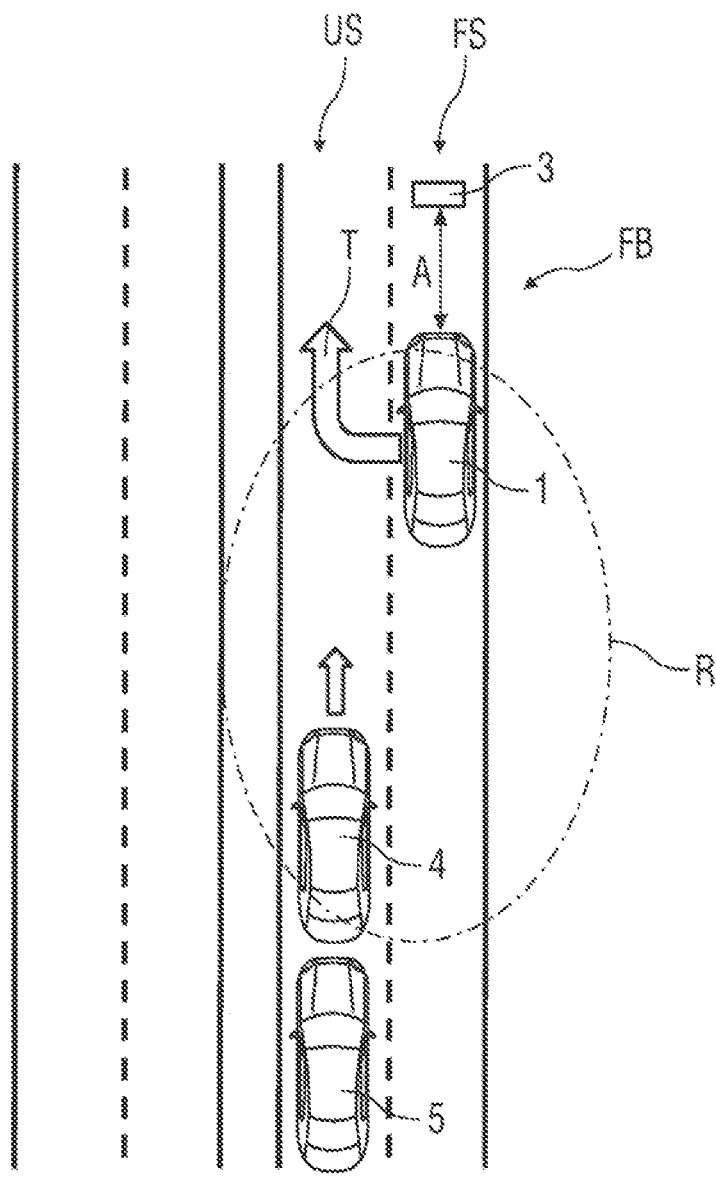
FIG. 2 schematic overhead view of another traffic situation.

FIG. 2 is an overhead view of another traffic situation at a point in time after the other vehicle 4 has moved in the direction of the automatically driving vehicle 1 to provide support.

To support the automatically driving vehicle 1 in passing the obstacle 3, the goal is for the other vehicle 4 to slow or block traffic located behind it in the fast lane US, shown here as another vehicle 5, so that a safe lane change to the fast lane US and safe passing of the obstacle 3 are possible for the automatically driving vehicle 1.

For this purpose, the center additionally instructs the other vehicle 4 to change to the fast lane before reaching the waiting automatically driving vehicle 1 and to adjust its speed such that following traffic is slowed and the automatically driving vehicle 1 can safely execute the lane change to the fast lane US.

After the center selects the other vehicle, real-time position information is exchanged between the automatically driving vehicle 1 and the other vehicle 4.

Then the other vehicle 4 is detected in surroundings data detected by the surroundings detection sensor system on the automatically driving vehicle 1, and the automatically driving vehicle 1 compares a position of the other vehicle 4 determined based on the surroundings data with position information received from the other vehicle 4.

Next the automatically driving vehicle 1 detects the speed of the other vehicle 4, for example also based on the surroundings data detected by the surroundings detection sensor system, and a trajectory T for making the lane change to the fast lane US and for safely passing the obstacle 3 is determined based on that speed and the position of the other vehicle 4.

After determination of the trajectory T, the automatically driving vehicle 1 makes the lane change automatically, if the determined risk of a collision with the other vehicle 4 or another vehicle 5 while making the lane change is within a preset limit value and it can therefore be executed safely.

LIST OF REFERENCE INDICATORS

1 Vehicle
2 Vehicle
3 Obstacle
4 Vehicle
5 Vehicle
A Distance
FB Roadway
FS Driving lane
R Range extent
T Trajectory
US Fast lane

The invention claimed is:

1. A method for supporting an automatically driving vehicle, comprising:
   if it is not possible for the automatically driving vehicle to make an automatic lane change to a fast lane in order to pass an obstacle located in a roadway in front of the automatically driving vehicle,
   the automatically driving vehicle stops before reaching the obstacle,
   the automatically driving vehicle sends a support query to a center outside of the vehicle, wherein together with the support query, the automatically driving vehicle sends the center a current position of the automatically driving vehicle and the current range extent of a surroundings detection sensor system of the automatically driving vehicle, the center outside of the automatically driving vehicle designates another vehicle in the area of the automatically driving vehicle, and the center outside of the automatically driving vehicle instructs the designated other vehicle to move in the direction of the automatically driving vehicle and change to the fast lane before reaching it, wherein the other vehicle adapts its driving maneuvers and driving style to the range extent of the automatically driving vehicle's sensor system, wherein the center outside of the automatically driving vehicle instructs the designated other vehicle to adjust a speed of the designated other vehicle such that following traffic located behind the designated other vehicle in the fast lane is slowed or blocked so that the automatically driving vehicle can safely execute the lane change to the fast lane, wherein the automatically driving vehicle is recognized by the other vehicle and/or the other vehicle is recognized by the automatically driving vehicle using data from an onboard sensor array on each vehicle and classification methods or based on the assessment of signals from light emitters on each vehicle.

2. The method as in claim 1, wherein real-time position information is exchanged between the automatically driving vehicle and the other vehicle after it is selected by the center.

3. The method as in claim 1, wherein the other vehicle reduces its speed no later than when changing to the fast lane.

4. The method as in claim 1, wherein the other vehicle is detected in surroundings data detected by a surroundings detection sensor system on the automatically driving vehicle, and the automatically driving vehicle compares a position of the other vehicle determined in that manner with received position information pertaining to the other vehicle.

5. The method as in claim 1, wherein the speed of the other vehicle is detected by the automatically driving vehicle, and based on that speed and the position of the other vehicle, a trajectory is determined for safely passing the obstacle.

6. The method as in claim 5, wherein the automatically driving vehicle makes the lane change automatically, if the determined risk of a collision with the other vehicle or another vehicle while making the lane change is within a preset limit value.

7. The method as in claim 1, wherein the automatically driving vehicle stops behind the obstacle in such a way that the distance to the obstacle is at least that needed for the required acceleration before a lane change to the fast lane.

* * * * *